D. C. SLAGHT.
TRACTION WHEEL.
APPLICATION FILED OCT. 18, 1916.
1,274,341.
Patented July 30, 1918
2 SHEETS—SHEET 1.
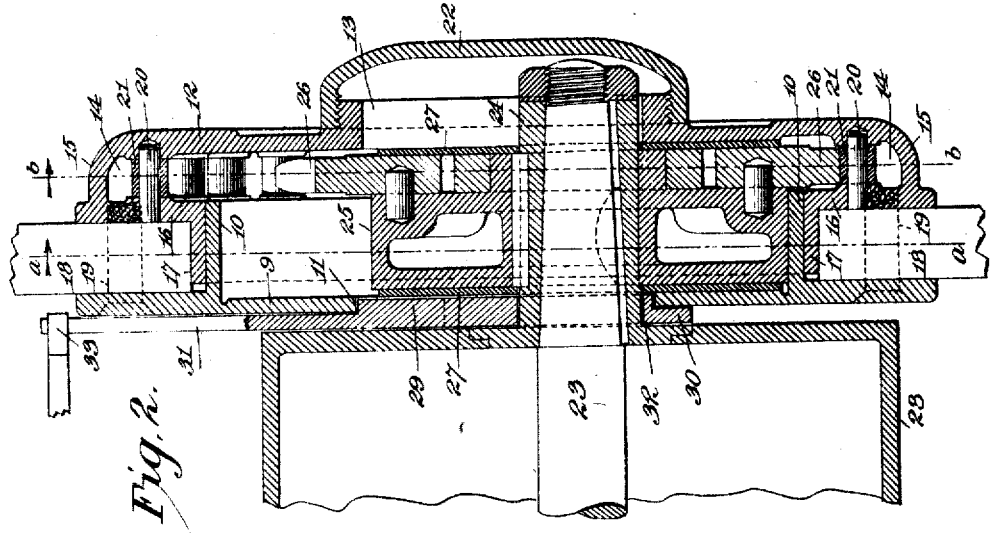
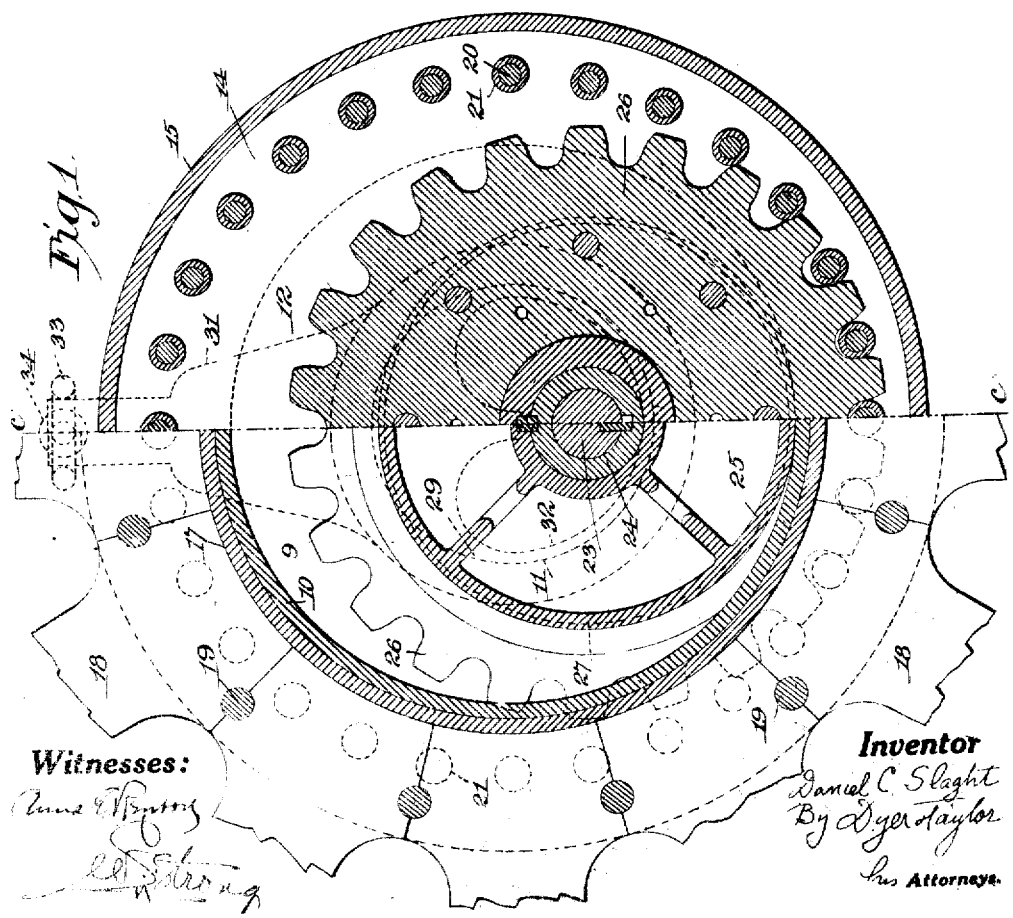
Witnesses:
Inventor
Daniel C. Slaght
By Dyer Taylor
his Attorneys

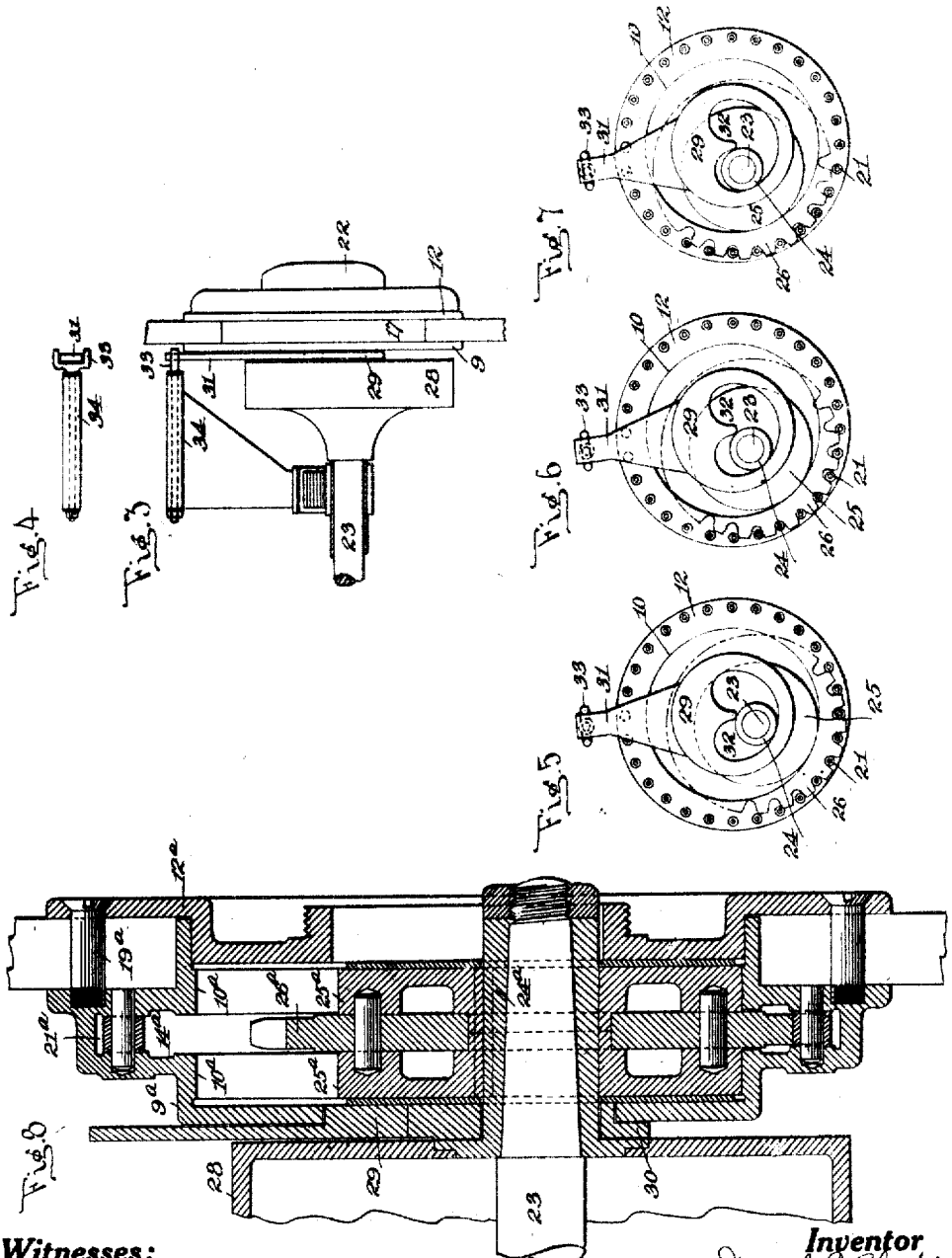

UNITED STATES PATENT OFFICE.

DANIEL C. SLAGHT, OF EASTON, PENNSYLVANIA, ASSIGNOR OF ONE-HALF TO PHILIP S. DYER, OF PHILLIPSBURG, NEW JERSEY.

TRACTION-WHEEL.

1,274,341.

Specification of Letters Patent.

Patented July 30, 1918.

Application filed October 18, 1916. Serial No. 126,254.

*To all whom it may concern:*

Be it known that I, DANIEL C. SLAGHT, a citizen of the United States, and a resident of Easton, county of Northampton, and State of Pennsylvania, have invented a certain new and useful Improvement in Traction-Wheels, of which the following is a specification.

My invention relates to traction wheels of the same general type as those shown in the patent granted jointly to William T. Miller and myself under date of July 6, 1915 and numbered 1,145,088.

The objects of my invention are to simplify the construction of the device by reducing the number of parts and to cheapen the construction.

These and further objects will more fully appear in the following specification and accompanying drawings considered together or separately.

I have illustrated my invention in the accompanying drawings in which like reference characters designate corresponding parts in all of the several figures and in which—

Figure 1 is a double sectional view of my invention, the left half being taken on the line *a—a* of Fig. 2 and the right half being taken on the line *b—b* of the same figure.

Fig. 2 is a section taken on the line *c—c* of Fig. 1.

Fig. 3 is a detail rear elevation of a wheel and axle showing the stop mechanism.

Fig. 4 is a detail top view of the stop.

Figs. 5, 6 and 7 are diagrammatic views showing the operation of the wheel and stop mechanism; and Fig. 8 is a view similar to Fig. 2 but showing a modification.

Referring first to Figs. 1 to 7, 9 designates a disk shaped hub member having a concentric, annular flange 10 projecting from one face thereof and a central, circular opening 11 therein. Surrounding and carried by the flange 10 is a second hub member 12 of circular form and having a central, circular opening 13 therein. The member 12 is provided with an internal recess 14 formed by the outer wall of the member 12, the turned over portion 15 and the inturned portion 16 of the member. Extending outwardly from the inner edge of the portion 16 is a concentric flange 17 engaging the flange 10. The space between the members 9 and 12 outside of the flange 15 form a circular recess for the reception of a range of spokes 18 which are retained in position by means of bolts 19 which also act to secure the members 9 and 12 together.

Within the recess 14 is arranged a circular series of pins or shafts 20 each of which carries a roller 21. The rollers form a circular rack or internal gear. It will be observed that the pins 20 are carried wholly by the hub member 12 and perform no function except that of supporting the rollers 21. The pins have a driving fit with the hub member 12 and do not in any manner coöperate with the member 9 or the spokes. The bolts 19 by means of which the hub members and spokes are secured together are entirely independent of roller mounting devices and the hub may be shipped in knock down condition with the rollers 21 in place and may be assembled without disturbing the rollers or their supports.

If desired the rollers 21 may be dispensed with, the teeth of the pinion caused to engage the pins 20 directly. The pin, in the latter case, may be cylindrical, or that portion thereof with which the pinion teeth engage may be of proper internal gear tooth shape. A cap 2? is secured in place over the opening 13.

A driving axle shaft 23 passes through the openings 11 and 13 and carries at its outer, tapered end a sleeve or skein 24 which is keyed or otherwise secured against rotation on the axle shaft. A nut on the end of the axle shaft retains the skein on shaft.

Keyed or otherwise secured to the skein 24 is a roller 25 which is adapted to engage the inside of the flange 10. The roller is less in diameter than is the chamber formed by the flange and consequently the roller and axle shaft will always remain eccentric to the hub. A spur pinion 26 is rigidly secured to and concentric with the hub and the teeth of the pinion engage the rollers 21 forming the circular rack. Cheek plates 27–27 are carried on the skein one at each side of the roller 25 and pinion 26, which are in effect a unitary structure, and engage the members 9 and 12 respectively and take up wear at these points. The skein 24 carries a brake drum 28 which is therefore rigidly mounted on the axle shaft.

Mounted within the opening 11 is a disk 29 which is provided with a flange 30 from which projects a radial finger 31. The disk has a segmental slot 32 through which the axle shaft projects. The disk is concentric with the hub and the slot permits eccentric planetary movement of the hub relatively to the shaft for a movement of 180 degrees. The outer end of the finger 31 engages a fork 33 which is rotatably carried in a bearing 34 mounted upon axle shaft.

In Fig. 8 I show a modification wherein the axle supporting roller is divided and the pinion is carried between the portions of the roller. In the figure 9 designates a chambered hub which is closed by cover 12ª secured in place by means of bolts 19ª which also secures the spokes in position. Within the hub are two cylindrical surfaces 10ª—10ª with which engage two rollers 25ª—25ª which have secured between them a spur pinion 26ª. The rollers and pinion form a unitary structure which is keyed to a skein 24ª which in turn is made fast to the axle shaft. Between the surfaces 10ª—10ª, is a cavity 14ª which is greater in diameter than are the surfaces and in the cavity is arranged a circular rack composed of antifriction rollers 21ª with which the pinion engages. The slotted stop plate and the brake drum are identical with, and the operation of the device is exactly the same as in the structure shown in Figs. 1 to 8.

The operation of the device is as follows:

When the vehicle of which the invention forms a part is at rest the wheel is in the position shown in Fig. 1. If we assume that the vehicle is propelled by a four cylinder, 40 horse power motor the explosion in the first cylinder or 10 horse power will be exerted to turn the axle. This power is not sufficient to start the load but will cause the pinion to rotate and, as the inertia of the load will prevent its movement along the supporting surface, the pinion will rotate relatively to the hub and wheel and up on the circular rack to the left. This will raise the weight of the load and move it forward of the center of gravity of the wheel as shown in Fig. 5. The explosion of the second cylinder will raise the load higher and move it farther forward as in Fig. 6. The next explosion will carry the parts to the position shown in Fig. 7 and the firing of the fourth cylinder will move the parts still higher and farther forward. As the load moves forward without turning the wheel the leverage of pinion increases and should the car be resting on a level surface the weight of the load will cause the rack to move with the pinion and rotate the wheel. When the wheel rotates it will do so without slipping and wear on the tire will be reduced to a minimum. When the car starts the pinion will move down to the position shown in Fig. 1 and the car will be driven with the parts in such position until an obstruction is encountered. When the hub is retarded by the tire encountering an obstruction the pinion will climb upon the rack as before and the weight of the load will help carry itself over such obstruction.

Should the car be at rest on a grade the early revolutions of the axle shaft will cause the load to climb until the angle of the engagement of the pinion with the rack will equal the angle of the grade and the car will be in the same position relatively to its supporting surface as if it were on a level. When running on a grade the pinion instead of swinging back to the position it assumes when traveling on a level will remain at the point where its effective angle counterbalances the grade.

If the resistance to the starting of the vehicle be so great that the pinion climbs to a position 90 degrees from that shown in Fig. 1 the axle shaft will reach the end of the segmental slot in the stop disk 28 and the pinion will remain in that position until the fly-wheel stores up enough energy to start the wheel. The stop prevents the pinion from climbing so high that it will fall from its engagement with the rack through the attraction of gravity.

The weight of the vehicle will, when the car is running, be taken by the hub through the engagement of the roller 25 with the flange 10 and not by the teeth of the pinion and rack. The roller and its engaging surface with the single contact produce an antifriction device of ultimate simplicity and is equally as effective as rows of balls or rollers.

I have shown and described my invention as applied to the driving wheel of an automobile, but it is obvious that it may be applied to non-driving wheels as well.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having now described my invention what I claim as new and desire to secure by Letters Patent, is:

1. A device of the character described having an axle shaft, a toothed wheel carried by the shaft, a casing inclosing the wheel, an internal gear carried in the casing and in mesh with the toothed wheel, and a circular member on the axle shaft concentric with the toothed wheel and bearing on the casing.

2. A device of the character described, having an axle shaft, a toothed wheel carried on the shaft, a casing inclosing the wheel, there being a circular recess within the casing, an internal gear within the recess and in mesh with the toothed wheel, and a circular member concentric with and carried by the axle shaft, said member being eccentric with and bearing on the casing.

3. A device of the character described, having an axle shaft, a toothed wheel carried by the shaft, a two part casing inclosing the wheel, there being a circular recess in one part of the casing, a circular series of teeth within the recess and in mesh with the toothed wheel, and a circular member concentric with and carried by the axle shaft, said member being eccentric with and bearing on the interior of the casing.

4. A device of the character described, having an axle shaft, a toothed wheel carried by the shaft, a two part casing inclosing the wheel, there being a circular recess in one part of the casing, a circular series of relatively movable teeth within the recess and in mesh with the toothed wheel, and a circular member concentric with and carried by the axle shaft, said member being eccentric with and bearing on the interior of the casing.

5. A device of the character described, having an axle shaft, a toothed wheel carried by the shaft, a two part casing inclosing the wheel, there being a circular recess in one part of the casing, a circular series of roller teeth within the recess and in mesh with the toothed wheel, and a circular member concentric with and carried by the axle shaft, said member being eccentric with and bearing on the interior of the casing.

6. A device of the character described, having an axle shaft, a toothed wheel carried by the shaft, a casing having a cylindrical bore inclosing the wheel, there being a recess of greater diameter than the bore, an internal gear carried in the recess and in mesh with the toothed wheel, and a circular member on the axle shaft concentric with the toothed wheel and bearing on the casing.

7. A device of the character described, having an axle shaft, a toothed wheel carried by the shaft, a two part casing inclosing the wheel, there being a circular recess in one part of the casing, a cylindrical bore in the other part of the casing, a circular series of teeth within the recess and in mesh with the toothed wheel, and a circular member concentric with and carried by the axle shaft, said member being eccentric with and bearing on the bore of the casing.

8. A device of the character described, having an axle shaft, a circular member carried by the shaft, a toothed wheel carried by and concentric with the member, a hub member having a cylindrical bore surrounding and engaging the circular member and being eccentric thereto, a second hub member having a circular bore surrounding and eccentric with the toothed wheel, and a circular series of teeth within the last mentioned bore and in mesh with the toothed wheel.

9. A device of the character described, having an axle shaft, a toothed wheel carried on the shaft, a circular member carried by the shaft concentric with the toothed wheel, a casing surrounding the circular member and toothed wheel, a stop carried by the casing, and surrounding the axle shaft, there being a segmental slot in the stop to permit planetary movement of the axle in the casing and for limiting such movement.

10. A device of the character described, having an axle shaft, a toothed wheel carried on the shaft, a circular member carried by the shaft concentric with the toothed wheel, a casing surrounding the circular member and toothed wheel, a stop carried by the casing, and surrounding the axle shaft, there being a segmental slot in the stop to permit planetary movement of the axle in the casing and for limiting such movement, and a connection between the stop and the axle shaft.

11. A device of the character described, having an axle shaft, a toothed wheel carried on the shaft, a circular member carried by the shaft concentric with the toothed wheel, a casing surrounding the circular member and toothed wheel, a stop carried by the casing, and surrounding the axle shaft, there being a segmental slot in the stop to permit planetary movement of the axle in the casing and for limiting such movement, and a movable connection between the stop and the axle shaft.

12. A device of the character described, having an axle shaft, a toothed wheel carried on the shaft, a circular member carried by the shaft concentric with the toothed wheel, a casing surrounding the circular member and toothed wheel, a cheek plate between the circular member and the casing, a cheek plate between the toothed wheel and the casing, a stop carried by the casing and surrounding the axle shaft, there being a segmental slot in the stop to permit planetary movement of the axle in the casing and for limiting such movement.

13. A device of the character described, having an axle shaft, a circular member carried by the shaft, a toothed wheel carried by and concentric with the member, a hub member having a cylindrical bore surrounding and engaging the circular member and being eccentric thereto, a second hub member having a circular bore surrounding and eccentric with the toothed wheel and concentric with the bore of the first mentioned hub member, and a circular series of teeth within the last mentioned bore and in mesh with the toothed wheel, and means for securing the hub members together.

14. A device of the character described, having an axle shaft, a circular member carried by and concentric with the shaft, a toothed wheel carried by and concentric with the circular member, a hub section having a cylindrical bore surrounding and eccentric with relation to the circular member, a second hub section surrounding the first mentioned section, there being a circular recess in the second member, said recess being concentric with the bore and eccentric with and surrounding the toothed wheel, a circular series of pins extending across the recess and in mesh with the toothed wheel, and means for securing the hub members together.

15. A device of the character described, having an axle shaft, a circular member carried by and concentric with the shaft, a toothed wheel carried by and concentric with the circular member, a hub section having a cylindrical bore surrounding and eccentric with relation to the circular member, a second hub section surrounding the first mentioned section, there being a circular recess in the second member, said recess being concentric with the bore and eccentric with and surrounding the toothed wheel, a circular series of pins extending across the recess and in mesh with the toothed wheel, there being a circumferential recess between the hub members, a range of spokes seated in the recess, and means for securing the hub members and spokes together.

16. A device of the character described, having an axle shaft, a toothed wheel carried by the shaft, a casing inclosing the wheel, an internal gear carried in the casing and in mesh with the toothed wheel, and a circular member on the axle shaft on each side of and concentric with the toothed wheel and bearing on the casing.

17. A device of the character described, having an axle shaft, a toothed wheel carried on the shaft, a casing inclosing the wheel, a circular recess within the casing, an internal gear within the recess and in mesh with the toothed wheel, and a circular member on each side of and concentric with and carried by the axle shaft, said members being eccentric with and bearing on the casing.

18. A device of the character described, having an axle shaft, a toothed wheel carried by the shaft, a circular member on each side of the toothed wheel, a hub member surrounding the circular members and toothed wheel, said hub member having two circular tracks eccentric to and engaging the circular members, there being a circular recess between and of greater diameter than the tracks and concentric therewith, a circular series of teeth extending across the recess and meshing with the toothed wheel, a second hub member, there being a circumferential recess between the hub members, a range of spokes seated in the recess and bolts for securing the hub members together and to the spokes.

19. A device of the character described, having an axle shaft, a wheel, means carried by the shaft for driving the wheel, and a member carried by and supporting the shaft by engagement with the hub of the wheel.

20. A device of the character described, having an axle shaft, a wheel, means carried by the shaft for driving the wheel, and a member carried by and concentric with the shaft and supporting the same by engagement with the hub of the wheel.

21. A device of the character described, having an axle shaft, a wheel, means carried by the shaft for driving the wheel, and a member carried by and supporting the shaft by a rolling contact with the interior of the hub of the wheel.

22. A device of the character described, having an axle shaft, a wheel, means carried by the shaft for driving the wheel, and a member carried by and concentric with the shaft and supporting the same by a rolling contact with the interior of the hub of the wheel.

23. A device of the character described, having an axle shaft, a member carried by and concentric with the shaft, a wheel, means carried by the shaft for driving the wheel, said member engaging the bore of the wheel hub and supporting the shaft by a rolling contact therewith, said member being of less diameter than the bore of the hub.

24. A device of the character described, having an axle shaft, a wheel, means carried by the shaft for driving the wheel, means whereby the wheel may move relatively to the shaft, and means for limiting such movement.

25. A device of the character described, having an axle shaft, a wheel, means carried by the shaft for driving the wheel, means whereby the wheel may move relatively to the shaft, and means carried by the wheel for limiting such movement.

26. A device of the character described, having an axle shaft, a wheel, means carried by the shaft for driving the wheel, means whereby the wheel may move relatively to the shaft, and means surrounding the axle shaft for limiting such movement.

27. A device of the character described, having an axle shaft, a wheel, means carried by the shaft for driving the wheel, means whereby the wheel may move relatively to the shaft, and means carried by the wheel and surrounding the axle shaft for limiting such movement.

28. A device of the character described, having an axle shaft, a wheel, means carried by the shaft for driving the wheel, such driving connection providing means whereby the shaft may move relatively to the wheel while in driving relation therewith, and means for limiting such relative movement.

29. A device of the character described, having an axle shaft, a wheel, means carried by the shaft for driving the wheel, such driving means permitting relative movement of the wheel and shaft, and a member carried by the wheel for limiting such relative movement.

30. A device of the character described, having an axle shaft, a wheel, means carried by the shaft for driving the wheel, such driving means permitting relative movement of the wheel and shaft, and a member carried by and concentric with the wheel for limiting such relative movement, said member having a slot through which the shaft projects.

31. A device of the character described, having an axle shaft, a wheel, means carried by the shaft for driving the wheel, such driving means permitting relative movement of the shaft and wheel while in driving relation, and a member carried by the wheel and capable of movement relatively thereto, there being a slot in the member through which the shaft projects, said slot being eccentric to the shaft whereby the shaft will be retained in driving relation to the wheel while permitting relative movement of the wheel and shaft.

32. A device of the character described, having an axle shaft, a wheel, means carried by the shaft for driving the wheel, such driving means permitting relative movement of the shaft and wheel while in driving relation, a member carried by the wheel and capable of movement relatively thereto, there being a slot in the member through which the shaft projects, said slot being eccentric to the shaft whereby the shaft will be retained in driving relation to the wheel while permitting relative movement of the wheel and shaft, and means for preventing rotation of the member.

This specification signed and witnessed this 16th day of October, 1916.

DANIEL C. SLAGHT.

Witnesses:
J. L. WICKKISE,
HENRY F. RICHTER.